United States Patent [19]
Ooi

[11] Patent Number: 5,613,195
[45] Date of Patent: Mar. 18, 1997

[54] BURST OUTPUT TIMING CONTROL SYSTEM IN SATELLITE COMMUNICATION SYSTEM

[75] Inventor: Tomoyuki Ooi, Tokyo, Japan

[73] Assignee: NEC Corporation, Japan

[21] Appl. No.: 606,227

[22] Filed: Feb. 23, 1996

Related U.S. Application Data

[63] Continuation of Ser. No. 241,484, May 12, 1994, abandoned.

[30] Foreign Application Priority Data

May 12, 1993 [JP] Japan ................................. 5-132374

[51] Int. Cl.$^6$ ................................................. H04B 7/185
[52] U.S. Cl. .................. 455/13.2; 455/12.1; 455/51.1; 455/53.1; 455/56.1; 455/67.6; 375/356
[58] Field of Search ......................... 455/12.1, 13.2, 455/51.1, 51.2, 13.1, 33.1, 53.1, 56.1, 67.1, 67.6, 67.5, 88; 370/104.1, 100.1; 375/356, 354

[56] References Cited

U.S. PATENT DOCUMENTS

| | | | |
|---|---|---|---|
| 4,218,654 | 8/1980 | Ogawa et al. | 455/12.1 |
| 4,320,503 | 3/1982 | Acampora | 455/12.1 |
| 4,607,257 | 8/1986 | Noguchi | 370/104.1 |

FOREIGN PATENT DOCUMENTS

| | | |
|---|---|---|
| 1-229528 | 9/1989 | Japan . |
| 3-128532 | 5/1991 | Japan . |

*Primary Examiner*—Reinhard J. Eisenzopf
*Assistant Examiner*—Doris To
*Attorney, Agent, or Firm*—Ostrolenk, Faber, Gerb & Soffen, LLP

[57] ABSTRACT

In a method for controlling a burst output timing in a satellite communication system for performing radio communication between a central earth station and a plurality of remote earth stations via a satellite, the time between a transmission of burst data from each of the remote earth stations to the central earth station via the satellite and the reception of the burst data returned from the central earth station via the satellite is time-counted. The output timing of the burst data transmitted from each remote earth station is adjusted, when the burst data is to be sent to the central earth station, in accordance with a time difference between the time and a preset reference time. A burst output timing control system is also disclosed.

11 Claims, 4 Drawing Sheets

BURST OUTPUT TIMING CONTROL SYSTEM IN SATELLITE COMMUNICATION SYSTEM

This is a Continuation of application Ser. No. 08/241,484, filed on May 12, 1994, now abandoned.

BACKGROUND OF THE INVENTION

The present invention relates to a burst output timing control system in a satellite communication system for performing radio communication between a central earth station and a plurality of remote earth stations via a satellite.

In a conventional satellite communication system, data communication is performed by a slotted ALOHA method using a star network. In this case, the distances from the areas in which remote earth stations are installed to a central earth station are different from each other. That is, the times taken for data from remote earth stations to reach the central earth station vary depending on the locations of the remote earth stations. For this reason, in the conventional system, burst data from each remote earth station is monitored in the central earth station, and the transmission timing of each burst data is adjusted in each remote earth station such that the time taken for each burst data to reach the central earth station becomes a predetermined time.

In such a conventional burst output timing control system, however, burst data from the respective remote earth stations must be monitored in the central earth station, and the monitor results must be informed to the respective remote earth stations to perform timing adjustment suitable for each remote earth station, resulting in cumbersome adjustment.

A transmission timing adjustment system is disclosed in Japanese Patent Laid-Open No. 3-128532. According to this system, in a time division multiple access radio communication system for performing radio communication between one central earth station and a plurality of remote earth stations by using burst signals, a timing adjustment signal is transmitted from each remote earth station to the central earth station within a control slot set in a corresponding transmission frame. In the central earth station, shifts in the reception phase of this timing adjustment signal from 0° and 180° as normal phases are detected, and a smaller value of the detected phase shifts is set as a detected phase shift amount. Information representing this phase shift amount is then informed to the remote earth station which has transmitted the above timing adjustment signal. The remote earth station adjusts its own transmission phase to nullify the phase shift amount in accordance with the information representing the phase shift amount and informed from the central earth station. Thereafter, a timing adjustment signal is transmitted from the remote earth station to the central earth station at the transmission timing set after the phase shift adjustment, and the central earth station detects the bit shift amount of the reception timing of this timing adjustment signal with respect to the normal reception timing in units of ½ bits. The central earth station informs the remote earth station, which has transmitted the above timing adjustment signal, of information representing this detected bit shift amount. The remote earth station adjusts its own transmission timing to nullify the bit shift amount in accordance with the information representing the bit shift amount.

If the output timing of burst data is adjusted by applying this transmission timing adjustment scheme to a satellite communication, the above problem of cumbersome adjustment can be solved.

In this output timing adjustment scheme, however, a control area is required in data because a timing adjustment signal is transmitted from a given remote earth station to the central earth station within a control slot set in a corresponding transmission frame. In addition, the central earth station requires a special circuit for detecting the timing adjustment signal. Therefore, a complicated hardware arrangement is required.

SUMMARY OF THE INVENTION

The present invention has been made to solve the above problem, and has as its object to provide a burst output timing control system which allows proper adjustment of the transmission timing of burst data in each remote earth station without requiring any complicated procedure for, e.g., timing measurement of burst data in a central earth station and adding any complicated hardware arrangement to the central earth station.

In order to achieve the above object, according to the present invention, there is provided a method for controlling a burst output timing in a satellite communication system for performing radio communication between a central earth station and a plurality of remote earth stations via a satellite, comprising steps, time-counting a time between a transmission of burst data from each of the remote earth stations to a central earth station via the satellite and a reception of the burst data returned from the central earth station via the satellite, and adjusting an output timing of the burst data transmitted from each remote earth station, when the burst data is to be sent to the central earth station, in accordance with a time difference between the time and a preset reference time.

According to the present invention, therefore, the output timing of burst data is adjusted in accordance with the difference between the distances from a remote earth station and the reference remote earth station to the central earth station.

In addition, each remote earth station starts a time counting operation at the same time when burst data is generated, and transmits the generated burst data at a predetermined transmission timing (adjustment amount=0). This burst data reaches the central earth station via the satellite and is returned to its own remote earth station via the satellite by the central earth station. Upon reception of the burst data transmitted from each remote earth station, each remote earth station stops the time counting operation, and measures the time between the generation of the burst data and the reception of the burst data. The remote earth station then compares the measured time and a preset reference time to check whether the remote earth station is farther or nearer from or to the satellite than the reference remote earth station (reference station), thereby adjusting the output timing of the burst data on the basis of the difference between these times.

DESCRIPTION OF THE PREFERRED EMBODIMENT

An embodiment of the present invention will be described in detail below.

Figure 1:
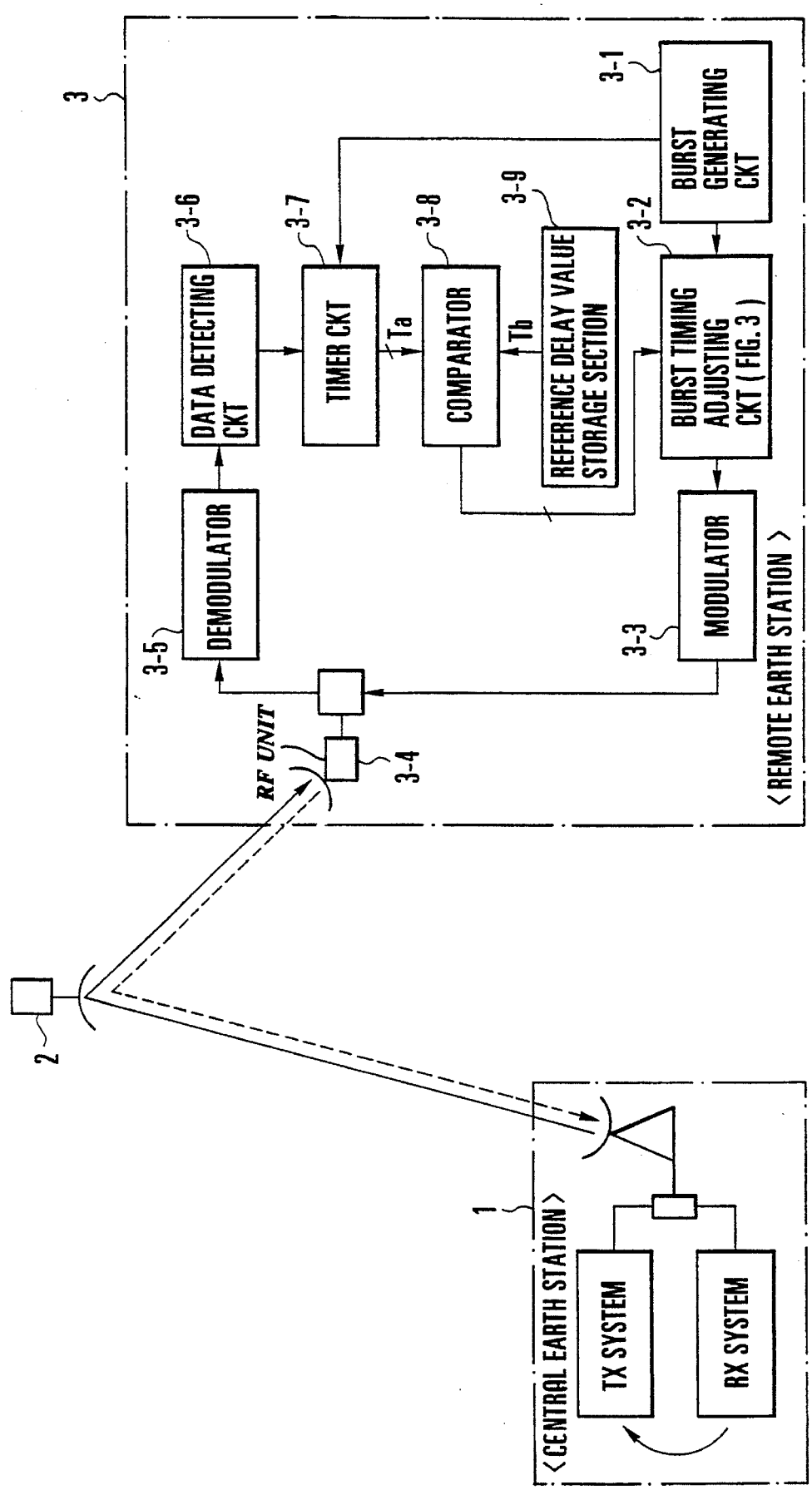
FIG. 1 is a block diagram showing the arrangement of a satellite communication system to which the present invention is applied.

FIG. 1 shows the arrangement of a satellite communication system to which the present invention is applied. Referring to FIG. 1, reference numeral 1 denotes a central earth station having a function of returning a received signal, as a signal in an IF band, to a transmission system. Upon reception of burst data from, e.g., a remote earth station (to be described later), the central earth station sends back the burst data to the remote earth station without any modification and any time delay. This operation is performed in the stage of, e.g., a test required in installation of an apparatus or maintenance. Since constituent elements other than the central earth station are not directly associated with the present invention, a description thereof will be omitted. Reference numeral 2 denotes a geostationary satellite, and reference numeral 3 denotes a remote earth station. In this embodiment, for the sake of convenience, only one of a plurality of remote earth stations is shown as the remote earth station 3.

The remote earth station 3 comprises a burst generating circuit 3-1, a burst timing adjusting circuit 3-2, a modulator 3-3, a remote earth station RF unit 3-4, a demodulator 3-5, a data detecting circuit 3-6, a timer circuit 3-7, a comparator 3-8, and a reference delay value storage section 3-9.

Figure 3:
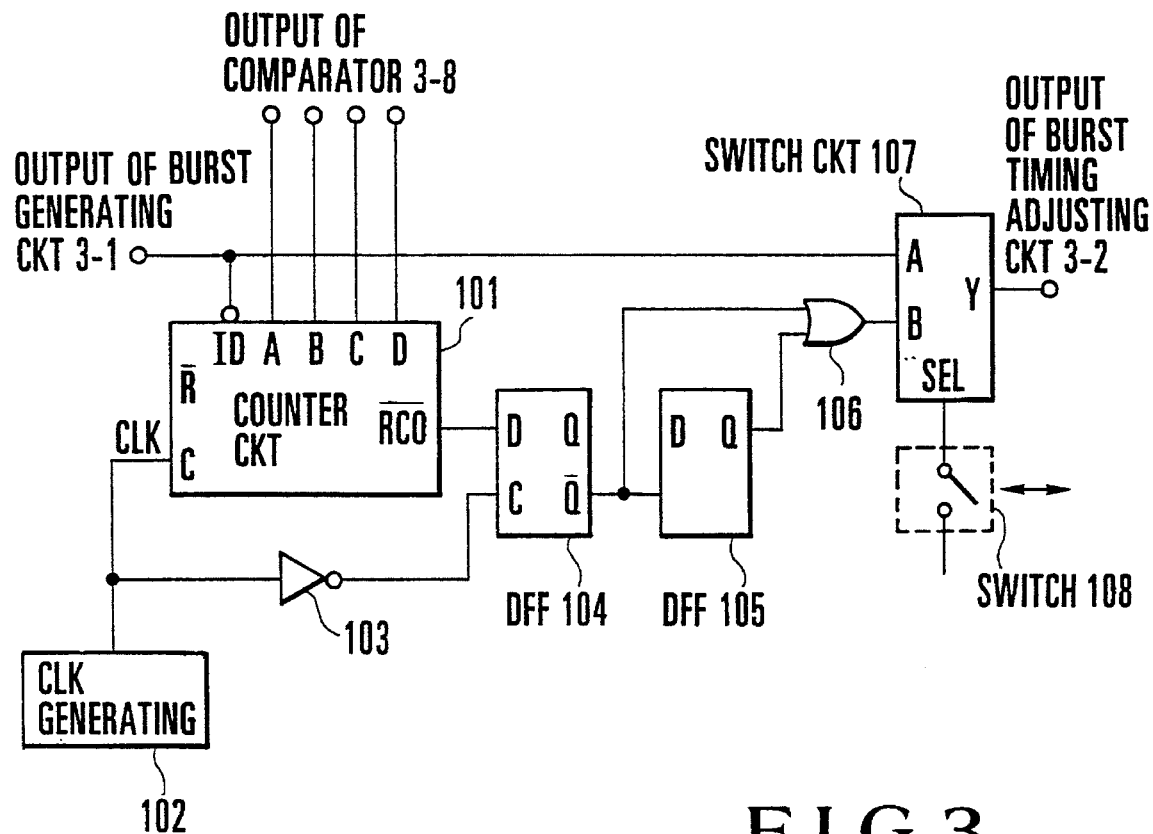
FIG. 3 is a detailed block diagram showing a burst timing adjusting circuit.
Figure 4:
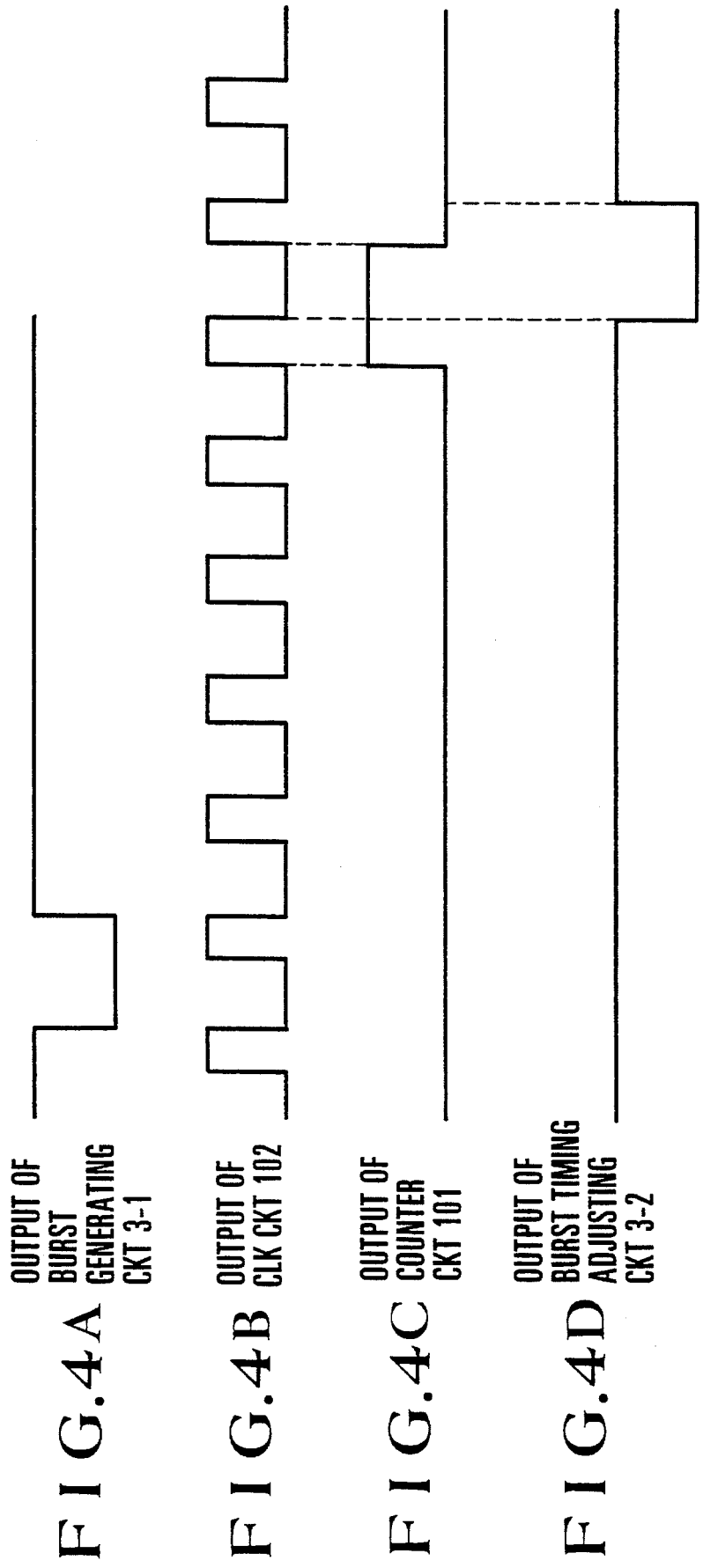
FIGS. 4A–D are a timing charts showing outputs from the respective components of the burst timing adjusting circuit.

FIG. 3 shows the details of the burst timing adjusting circuit 3-2. Referring to FIG. 3, an output signal from the burst generating circuit 3-1 is data for performing control to transmit a carrier from the modulator 3-3 for a period of time indicated by burst data. This data is inputted to a counter circuit 101 for counting clocks from a clock generator 102. The counter circuit 101 counts clocks by the number of bits corresponding to an output from the comparator 3-8. If a long delay time is required, a plurality of counter circuits 101 are connected to the clock generator 102. A signal delayed by a predetermined period of time is obtained at the output of an OR gate 106 in synchronism with a clock input. Delay time and non-delay time modes can be switched by a switch circuit 107. In the delay time mode, a switch 108 is closed. In the non-delay time mode, the switch 108 is open. An output signal from the switch circuit 107 is input, as an output from the burst timing adjusting circuit 3-2, to the modulator 3-3 to obtain a burst-like carrier delayed by a predetermined delay time.

FIGS. 4A–D show the outputs from the respective components of the above-described burst timing adjusting circuit 3-2.

The reference delay value storage section 3-9 serves to store a reference value of the propagation time required for burst data to reciprocate between the remote earth station and the central earth station via the satellite. As this reference value, one of the following values is used: one of values associated with the time required for burst data to reciprocate between the corresponding remote earth station and the central earth station via the satellite; and a time value calculated from a distance obtained on the basis of the latitude and longitude of the corresponding remote earth station and the position of the satellite. In this case, as a reference value, a value based on the remote earth station which is the remotest from the satellite in the network is used. As a result, since the remote earth station which is the remotest from the satellite exhibits the longest delay time in all the remote earth stations, the burst transmission adjustment times of the remaining remote earth stations can be delayed by times corresponding to the differences between the delay times. As is apparent, a value based on an arbitrary remote earth station may be used instead of the reference value based on the remote earth station which is the remotest from the satellite. In this case, if a processing time adjustment buffer is arranged in the central earth station or the remote earth station, the burst transmission adjustment time can be relatively advanced or delayed.

Figure 5:
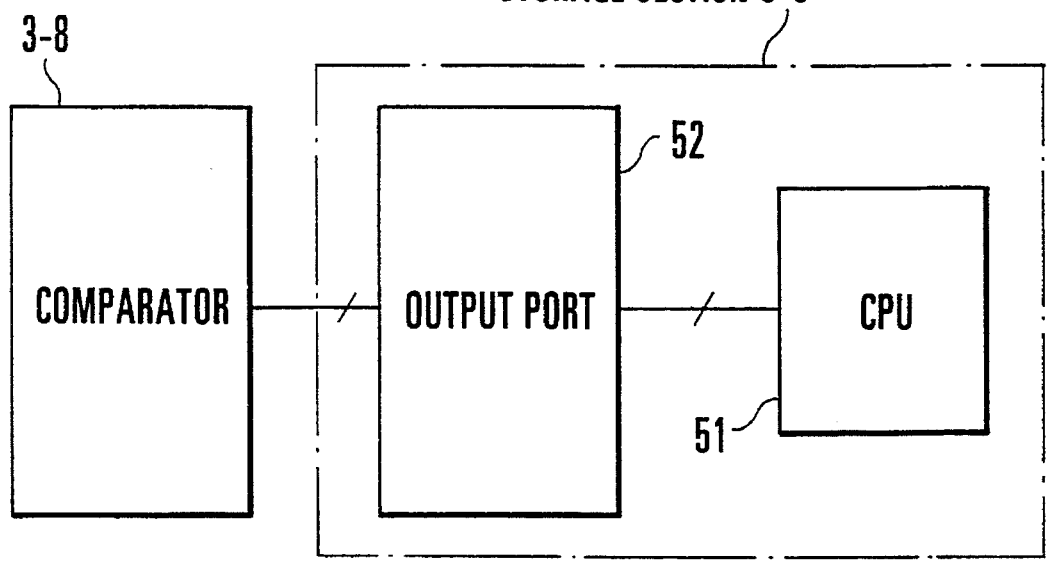
FIG. 5 is a block diagram showing a reference delay value storage section.

As shown in FIG. 5, the reference delay value storage section 3-9 is designed to output the above value stored in a CPU (central processing unit) 51 to the comparator 3-8 via an output port 52.

Figure 6:
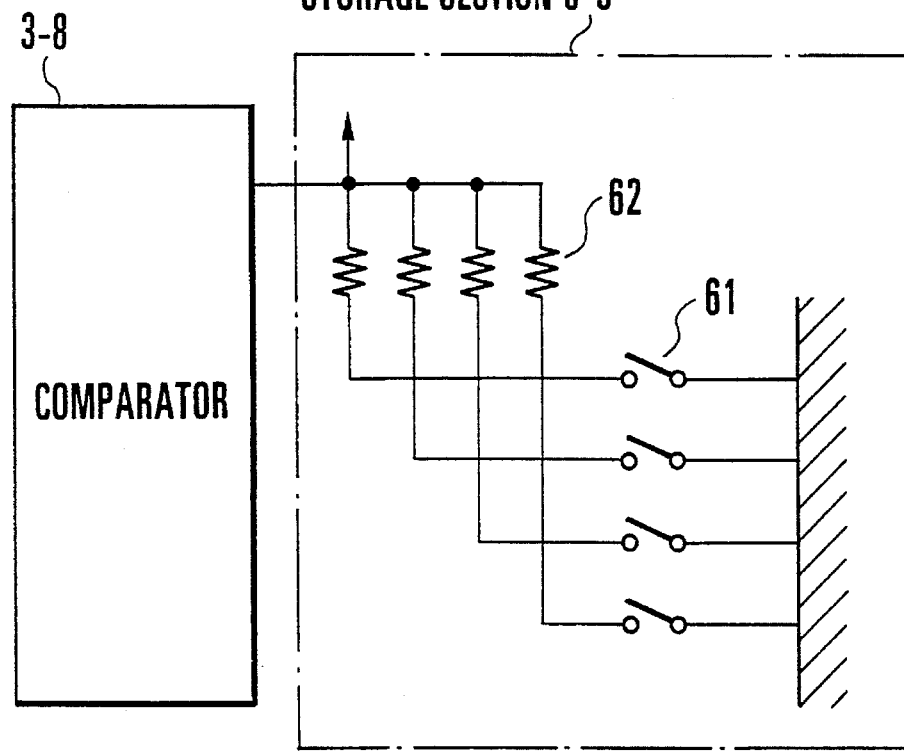
FIG. 6 is a block diagram showing another reference value storage section.

FIG. 6 shows another example of the reference delay value storage section 3-9. In this case, a reference value is constituted by a combination of switches 61 and resistors 62. That is, a reference value is set by a combination of ON and OFF states of the switches.

Operations in the remote earth station 3, which are unique to the embodiment, will be described next together with the function of each component.

Figure 2:
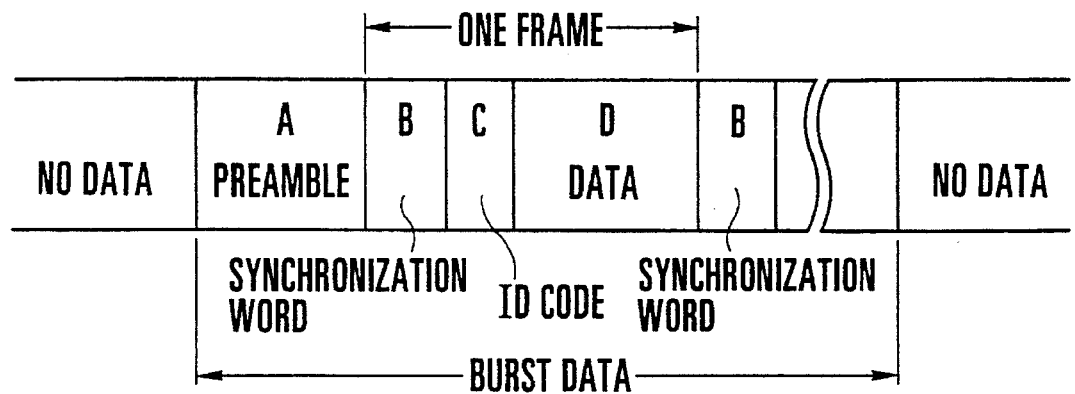
FIG. 2 is a chart showing the format of burst data.

The burst generating circuit 3-1 generates burst data, as shown in FIG. 2. As shown in FIG. 2, this burst data includes a preamble A, a synchronization word B, an ID code C, and data D in the order named. The synchronization word B, the ID code C, and the data D are repeatedly formed afterward a several number of times. In this case, signal components arranged between the synchronization word B following the preamble A and the next synchronization word constitute one frame. The preamble A is data for reproducing a carrier and a clock in a demodulation section at the receiving end. The synchronization word B is a fixed pattern uniquely determined in the system to perform frame synchronization at the receiving end. The ID code (control data) C is data representing signaling data or a remote earth station number required for data communication. The data D is information data to be transmitted/received. The timer circuit 3-7 starts a time counting operation at the same time when the burst data is generated. The burst data generated by the burst generating circuit 3-1 is supplied to the burst timing adjusting circuit 3-2 to be sent to the modulator 3-3 at a predetermined output timing (adjustment value=0). The burst data is then transmitted from the remote earth station RF unit 3-4.

The burst data transmitted from the remote earth station RF unit 3-4 reaches the central earth station 1 via the geostationary satellite 2. The central earth station 1 then returns the burst data to the remote earth station 3 via the satellite 2.

The remote earth station 3 receives the returned burst data via the remote earth station RF unit 3-4 and demodulates it via the demodulator 3-5. The demodulated burst data is supplied to the data detecting circuit 3-6, by which ID data (Identification data) is detected. Different ID data are assigned to the respective remote earth stations. Upon detection of its own ID data, the data detecting circuit 3-6 stops the time counting operation in the timer circuit 3-7. With this operation, the timer circuit 3-7 counts a time Ta between the instant at which the burst data is generated and the instant at which the burst data is received. That is, the time Ta is measured as a parameter equivalent to the distance from the satellite 2 to the remote earth station 3.

The time Ta measured by the timer circuit 3-7 is supplied to the comparator 3-8. The comparator 3-8 compares the measured time Ta supplied from the timer circuit 3-7 with a reference time Tb preset in the reference delay value storage section 3-9, and supplies a delay control signal, based on the difference between the times Ta and Tb, to the burst timing adjusting circuit 3-2.

The reference time Tb is set as a time equal to a time Ta measured in a reference station (not shown). The reference earth station is one freely or randomly selected from the remote earth stations. Therefore, the preset reference time Tb is defined based on a distance among the earth station which is the remotest from the central earth station, the satellite, and the central earth station. By comparing the measured time Ta and the reference time Tb, the comparator 3-8 can determine whether its own station is farther from the satellite 2 than the reference station, and hence the data transmission delay is larger, or its own station is nearer to the satellite 2 than the reference station, and hence the data transmission delay is smaller. The comparator 3-8 supplies a delay control signal to the burst timing adjusting circuit 3-2 on the basis of this determination result. More specifically, the comparator 3-8 supplies a delay control signal for advancing the output timing of the burst data when the data transmission delay is larger, and vice versa, thereby adjusting the output timing of the burst data.

More specifically, when the measured time Ta is longer than the reference time Tb, the output timing of the burst data is advanced by ½ the difference between the measured time Ta and the reference time Tb. When the measured time Ta is shorter than the reference time Tb, the output timing of the burst data is delayed by ½ the difference between the measured time Ta and the reference time Tb. With this operation, the burst positions of all the remote earth stations are aligned with each other on the satellite 2 so that the times taken for data from the remote earth stations to reach the satellite 2 can be made to be equal to each other.

As is apparent from the above description, according to the present invention, in each remote earth station, the time between the generation of burst data and the reception of the burst data is compared with a preset reference time, and the output timing of the burst data is adjusted on the basis of the difference between these times. Therefore, the output timing of burst data can be properly adjusted in each remote earth station without performing any complicated procedure for, e.g., timing measurement of burst data in the central earth station and adding any complicated hardware arrangement.

What is claimed is:

1. A method for controlling a burst output timing in a satellite communication system for performing radio communication between a central earth station and a plurality of remote earth stations via a satellite, comprising the steps of;

time-counting a time between a transmission of burst data from each of said remote earth stations to a central earth station via the satellite and a reception of the burst data returned from the central earth station via the satellite; and adjusting an output timing of the burst data transmitted from each remote earth station, when the burst data is to be sent to said central earth station, in accordance with a time difference between said time counting time and a preset reference time which is a time between a transmission of burst data from a reference remote earth station to the central earth station via the satellite and a reception of the burst data returned from the central earth station via the satellite.

2. A burst output timing control system in a satellite communication system for performing radio communication between a central earth station and a plurality of remote earth stations via a satellite, each of said remote earth stations comprising:

burst generating means for generating burst data;

timer means for starting a time counting operation at the same time when said burst generating means generates the burst data, burst output timing adjusting means for outputting the burst data, generated by said burst generating means, at a predetermined output timing so as to allow adjustment of the output timing;

transmission means for transmitting the burst data output from said burst timing adjusting means; and reception means for receiving the burst data which is transmitted from said transmission means and reaches said central earth station via said satellite, and is returned to said remote earth station via said satellite from said central earth station, wherein said remote earth station stops the time counting operation of said timer means upon reception of the burst data transmitted from said remote earth station, compares the counted time (Ta) between generation of the burst data and reception of the burst data with a preset reference time (Tb), and controls said burst output timing adjusting means on the basis of a difference between the counted time and the preset reference time, thereby adjusting an output timing of the burst data.

3. A burst output timing control system in a satellite communication system according to claim 2, wherein said preset reference time (Tb) is defined based on a distance among the earth station, the satellite and the central earth station, the earth station being the remotest from the central station.

4. A burst output timing control system in a satellite communication system according to claim 2, wherein said preset reference time (Tb) is defined based on a propagation time of the burst data among the earth station, satellite and the central earth station, the earth station being the remotest from the central station.

5. A burst output timing control system in a satellite communication system according to claim 2, wherein said burst output timing adjusting means comprises means for advancing the output timing of said burst data ½ the difference time between said Ta and said Tb when Ta>Tb and delaying the output timing of said burst data by ½ the difference time between said Ta and said Tb when Ta<Tb.

6. A burst output timing control system in a satellite communication system according to claim 2, wherein said burst data comprises an ID code assigned to each of said remote earth stations for identifying each of them.

7. A burst output timing control system in a satellite communication system for performing radio communication between a central earth station and a plurality of remote earth stations via a satellite, each of said remote earth stations comprising;

burst generation circuit for generating burst data;

timer circuit for starting a time counting operation at the same time when said burst generation circuit generates the burst data, burst timing adjusting circuit for outputting the burst data, generated by said burst generating circuit, at a predetermined output timing so as to allow adjustment of the output timing;

RF unit for transmitting the burst data output from said burst timing adjusting circuit and for receiving the burst data which is transmitted therefrom, which reaches said central earth station via said satellite, and which is returned to said remote earth station via said satellite from said central earth station, wherein said remote earth station stops the time counting operation of said timer circuit upon reception of the burst data transmitted from said remote earth station, compares the counted time (Ta) between generation of the burst data and reception of the burst data with a preset reference time (Tb), and controls said burst timing adjusting circuit on the basis of a difference between the counted time and the preset reference time, thereby adjusting an output timing of the burst data.

8. A burst output timing control system in a satellite communication system according to claim 7, wherein said preset references time (Tb) is defined based on a distance among the earth station, the satellite and the central earth station, the earth station being the remotest from the central station.

9. A burst output timing control system in a satellite communication system according to claim 7, wherein said preset reference time (Tb) is defined based on a propagation time of the burst data among the earth station, the satellite and the central earth station, the earth station being the remotest from the central station.

10. A burst output timing control system in a satellite communication system according to claim 7, wherein said burst timing adjusting circuit comprises means for advancing the output timing of said burst date ½ the difference time between said Ta and Tb when Ta>Tb, and for delaying the output timing of said burst data by ½ the difference time between said Ta and said Tb when Ta<Tb.

11. A burst output timing control system in a satellite communication system according to claim 7, wherein said burst data comprises an ID code assigned to each of said remote earth stations for identifying each of them.

\* \* \* \* \*